United States Patent
Gupta et al.

(10) Patent No.: US 12,056,502 B1
(45) Date of Patent: Aug. 6, 2024

(54) CUSTOMIZED FIT IMAGE DESCRIPTORS FOR RESOURCES STORED OVER THE NETWORK

(71) Applicant: American Megatrends International, LLC, Duluth, GA (US)

(72) Inventors: Chitrak Gupta, Kolkata (IN); Venkatesan Balakrishnan, Chennai (IN); Anurag Bhatia, Sugar Hill, GA (US); Ajay Kumar Gupta, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 72 days.

(21) Appl. No.: 18/098,838

(22) Filed: Jan. 19, 2023

(51) Int. Cl.
*G06F 9/44* (2018.01)
*G06F 8/61* (2018.01)
*G06F 9/4401* (2018.01)

(52) U.S. Cl.
CPC .............. *G06F 9/4416* (2013.01); *G06F 8/63* (2013.01)

(58) Field of Classification Search
CPC .................................. G06F 9/4416; G06F 8/63
See application file for complete search history.

(56) References Cited

U.S. PATENT DOCUMENTS 10,768,948 B2   9/2020   Lambert et al.
10,778,650 B2   9/2020   Rahardjo et al.

*Primary Examiner* — Zahid Choudhury
(74) *Attorney, Agent, or Firm* — LOCKE LORD LLP; Tim Tingkang Xia, Esq.

(57) ABSTRACT

In an aspect of the disclosure, a method, a computer-readable medium, and a computer system are provided. The computer system includes a BMC. The BMC determines a booting configuration based on setting of the BMC. The BMC determines, from a firmware image and according to the booting configuration, a group of components, of an OS of the BMC, to be loaded into a memory of the BMC. The BMC determines, from the firmware image, storage locations of the group of components. The BMC obtains a first set of components of the group from one or more network locations according to the storage locations.

18 Claims, 9 Drawing Sheets

200

```
/dts-v1/;    its 202

/ {
    description = "AMI FIT test";
    #address-cells = <1>;

images { //210
        kernel@212-1 {
            description = "My default kenel";
            data = /incbin/("./zImage");
            type = "kernel";
            arch = "arm";
            os = "linux";
            compression = "none";
            load = <0x83800000>;
            entry = <0x83800000>;
            hash@1 {
                algo = "sha256";
            };
        };
        kernel@212-2 {...
            data = /incbin/("./zImage2");
            ...};
          ...;
        kernel@212-O {...
            data = /incbin/("./zImageO");
            ...};
        kernel@262-1 {
            description = "Rescue image";
            data = /tftp/("./anotherimage");
            type = "kernel";
            arch = "arm";
            os = "linux";
            compression = "none";
            load = <0x83800000>;
            entry = <0x83800000>;
            hash@1 {
                algo = "md5";
            };
        };
          ...;
        kernel@262-L {...};

```
// continued initrd@214-1 {
    description = "my local ramdisk";
    data = /incbin/("./ramdisk");
    type = "ramdisk";
    arch = "ppc";
    os = "linux";
    compression = "gzip";
    load = <00000000>;
    entry = <00000000>;
    hash@1 {
        algo = "sha1";
    };
};
   ...;
initrd@214-P {...};

initrd@264-1 {
    description = "my cloud ramdisk";
    data = /tftp/("./ramdisk2");
    type = "ramdisk";
    arch = "ppc";
    os = "linux";
    compression = "gzip";
    load = <00000000>;
    entry = <00000000>;
    hash@1 {
        algo = "sha1";
    };
};
   ...;
initrd@264-M {...};

DTB@216-1 {
        description = "FDT for my cool board";
        data = /incbin/("./devicetree.dtb");
        type = "flat_dt";
        arch = "arm";
        compression = "none";
        hash@1 {
            algo = "crc32";
        };
    };
    ...;
    DTB@216-Q {...};

DTB@266-1 {
        description = "FDT for my hot board";
        data = /tftp/("./devicetree2.dtb");
        type = "flat_dt";
        arch = "arm";
        compression = "none";
        hash@1 {
            algo = "crc32";
        };
    };
    ...;
    DTB@266-N {...};
};

configurations { //220
    default = "config@282-1";

config@282-1 {
        description = "Default configuration";
        kernel = "kernel@212-1";
        initrd = "initrd@214-1";
        DTB = "DTB@216-1";
    };

config@282-2 {
        description = "Rescue configuration";
        kernel = "kernel@212-2";
        initrd = "initrd@214-2";
        DTB = "DTB@266-3";
    };
    ...;

config@282-T {...};
};
```

FIG. 2(C)

CUSTOMIZED FIT IMAGE DESCRIPTORS FOR RESOURCES STORED OVER THE NETWORK

BACKGROUND

Field

The present disclosure relates generally to computer systems, and more particularly, to techniques of booting baseboard management controller (BMC) from firmware image.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a BMC. The BMC determines a booting configuration based on setting of the BMC. The BMC determines, from a firmware image and according to the booting configuration, a group of components, of an OS of the BMC, to be loaded into a memory of the BMC. The BMC determines, from the firmware image, storage locations of the group of components. The BMC obtains a first set of components of the group from one or more network locations according to the storage locations.

In another aspect of the disclosure, a method, a computer-readable medium, and a computer system are provided. The computer system includes a device. The device reads a source file specifying content of a firmware image. The device places, in the firmware image and according to the source file, a first collection of components and a collection of indicators indicating one or more network locations at which a second collection of components are stored. The device places a collection of booting configurations in the firmware image. Each booting configuration indicates a respective group of components, of an operating system (OS) of a baseboard management controller (BMC) and selected from at least one the first collection of components and the second collection of components, to be loaded into the memory in a single booting process. The device generates the firmware image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2(A), FIG. 2(B) and FIG. 2(C) are a diagram illustrating an example of an image tress source (ITS) file.

DETAILED DESCRIPTION

Figure 1:
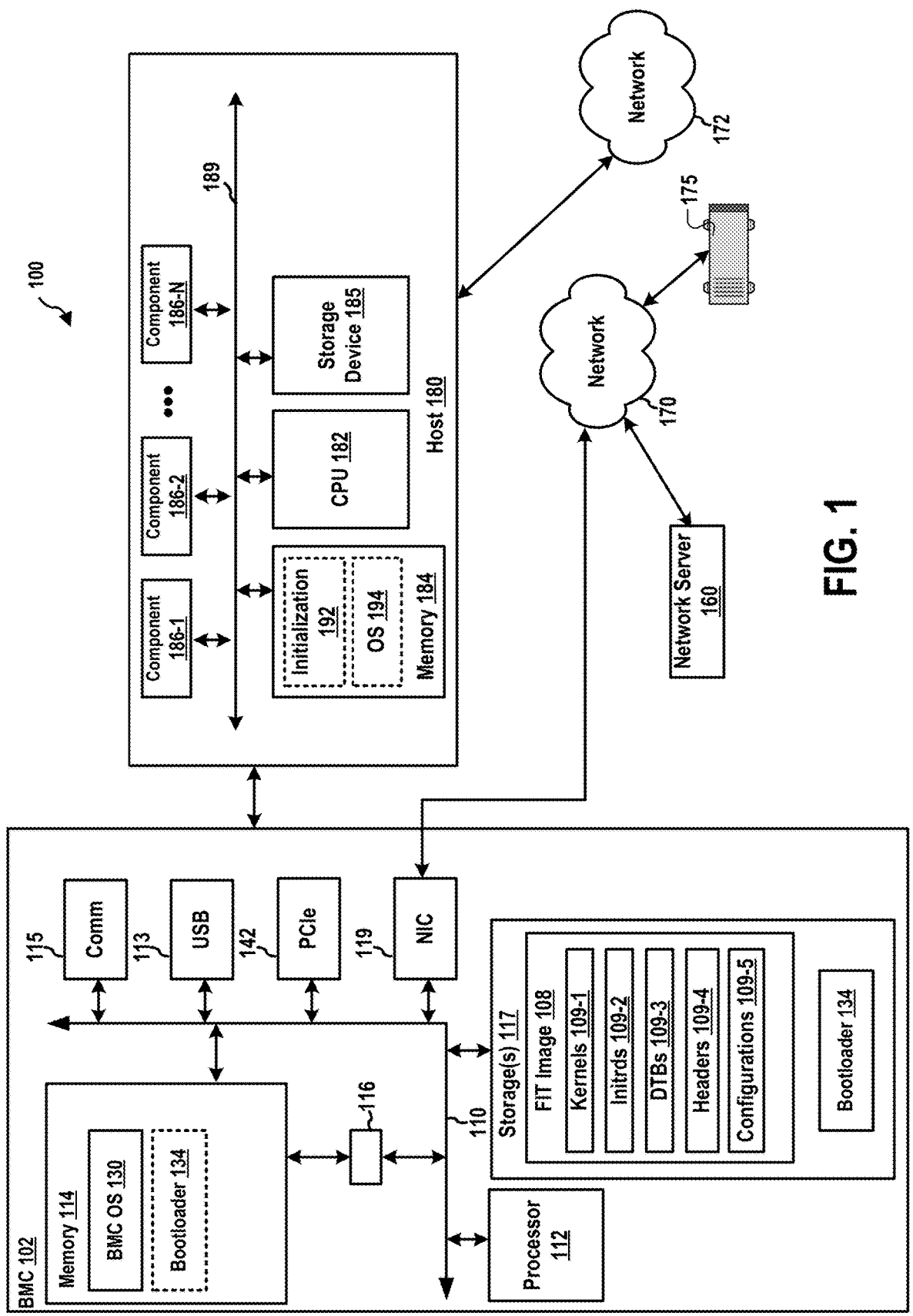
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, storage(s) 117, a network interface card 119, a Universal Serial Bus (USB) interface 113, a PCIe port 142, and other communication interfaces 115.

The communication interfaces 115 may include a keyboard controller style (KCS), a server management interface chip (SMIC), a block transfer (BT) interface, a system management bus system interface (SSIF), an inter-integrated circuit (i$^2$c) interface, and/or other suitable communication interface(s).

Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage(s) 117, the network interface card 119, the USB interface 113, and/or the communication interfaces 115 may be on the same chip. In addition, the memory 114, the processing unit 112, the memory driver 116, the storage(s) 117, the communication interfaces 115, and/or the network interface card 119 may be in communication with each other through a communication channel 110 such as a bus architecture.

The BMC 102 may store a bootloader 134 and a flattened image tree (FIT) image 108 in the storage(s) 117. The storage(s) 117 may utilize one or more non-volatile, non-transitory storage media devises. The FIT image 108 may contain kernel(s) 109-1, initrd(s) 109-2, device tree blob(s) (DTBs) 109-3, header(s) 109-4 and configurations 109-5 etc., or network addresses of those components. An initial RAM disk (initrd) provides the capability to load a RAM disk by the bootloader 134.

As described infra, in a boot process, the processing unit 112 executes the bootloader 134. The bootloader 134 may select, according to a configuration, a kernel 109-1, an initrd 109-2, and a DTB 109-3 contained, or indicated in a header 109-4, in the FIT image 108 and load them into the memory 114. As described infra, those components to be loaded into the memory may be contained in the FIT image 108 or a network server 160, which is connected to the network interface card 119 through a communication network 170. The bootloader 134 locates and retrieves those components, and loads them into the memory 114. The processing unit 112 executes those components and, thus, a BMC operating system (OS) 130 is booted and can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, component devices 186-1 to 186-N, etc. Those component devices can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, those component devices can include hardware components of a computer 502 shown in FIG. 4. Each component is connected to a system bus 189 of the host computer 180.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

FIG. 2(A), FIG. 2(B) and FIG. 2(C) are diagrams 200 illustrating an example of an ITS file. The ITS file 202 includes an images node 210 and a configurations node 220. The images node 210 indicates the binaries that are to be contained in the FIT image or are to be stored on a storage server. The sub-nodes of the images node 210 describe individual binaries that can be included in the FIT image 108. Each of sub-nodes has some common properties including a type, information on the compression used and hash information. In this example, the sub-nodes specify kernels 212-1 to 212-0, initrds 214-1 to 214-P and DTBs 216-1 to 216-Q that will be included in the FIT image 108 and specify kernels 262-1 to 262-L, initrds 264-1 to 264-M and DTBs 266-1 to 266-N that will be stored on the network server 160. The kernel 212-1 is a default kernel, not compressed and hashed with SHA256. The kernel 262-1 is a rescue kernel, not compressed, and hashed with MD5.

Further, binaries from kernels, initrds and DTBs can be combined according to different requirement for each individual boot process. These different combinations form different configurations. In this example, sub-nodes of the configurations node 220 specify different configurations 282-1 to 282-T that each can be used for an individual boot. The configuration 282-1 is set as default configuration and uses the default kernel.

Figure 3A:
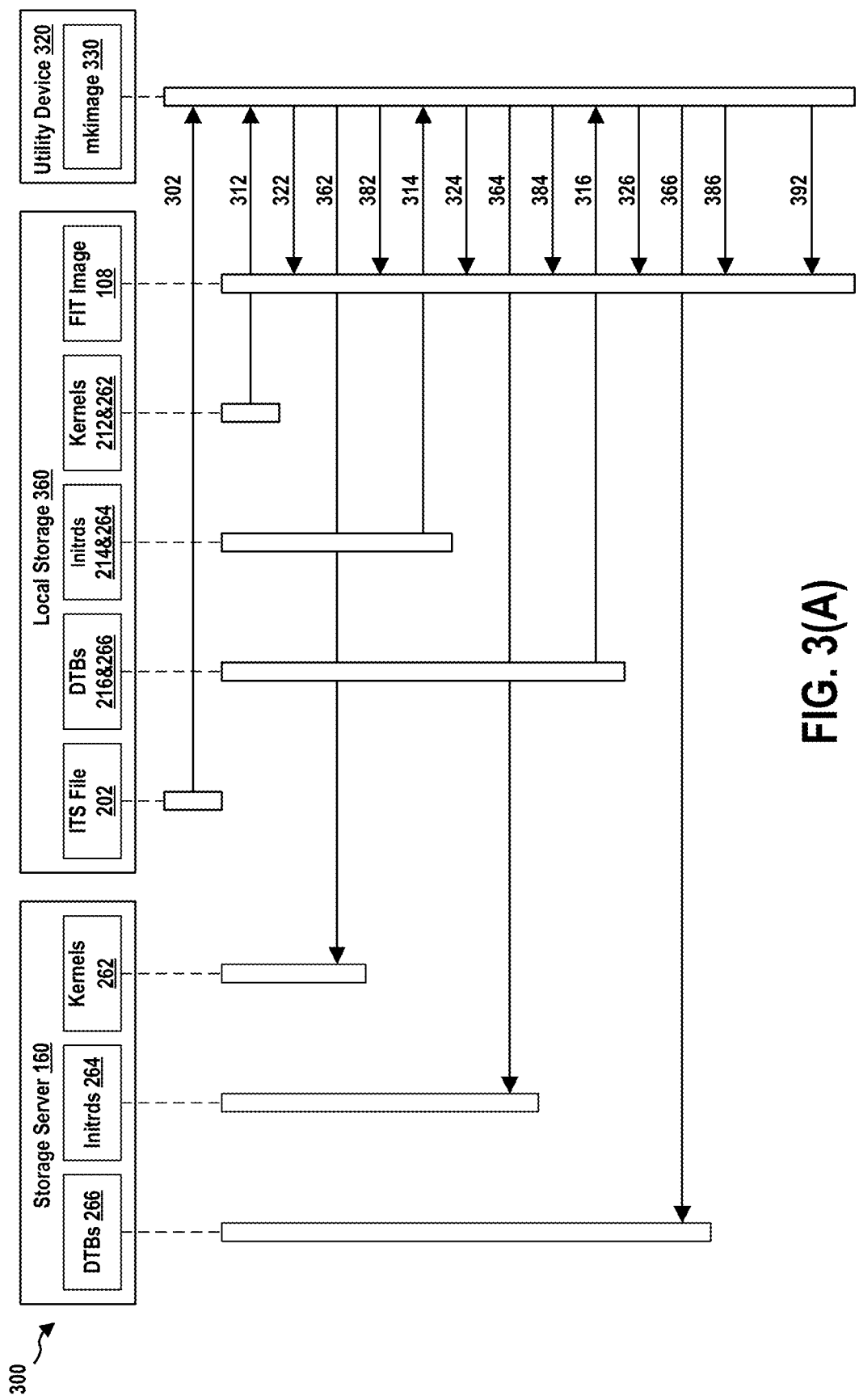
FIG. 3(A) and FIG. 3(B) are diagrams illustrating a sequence of procedures for generating an FIT image.
Figure 3B:
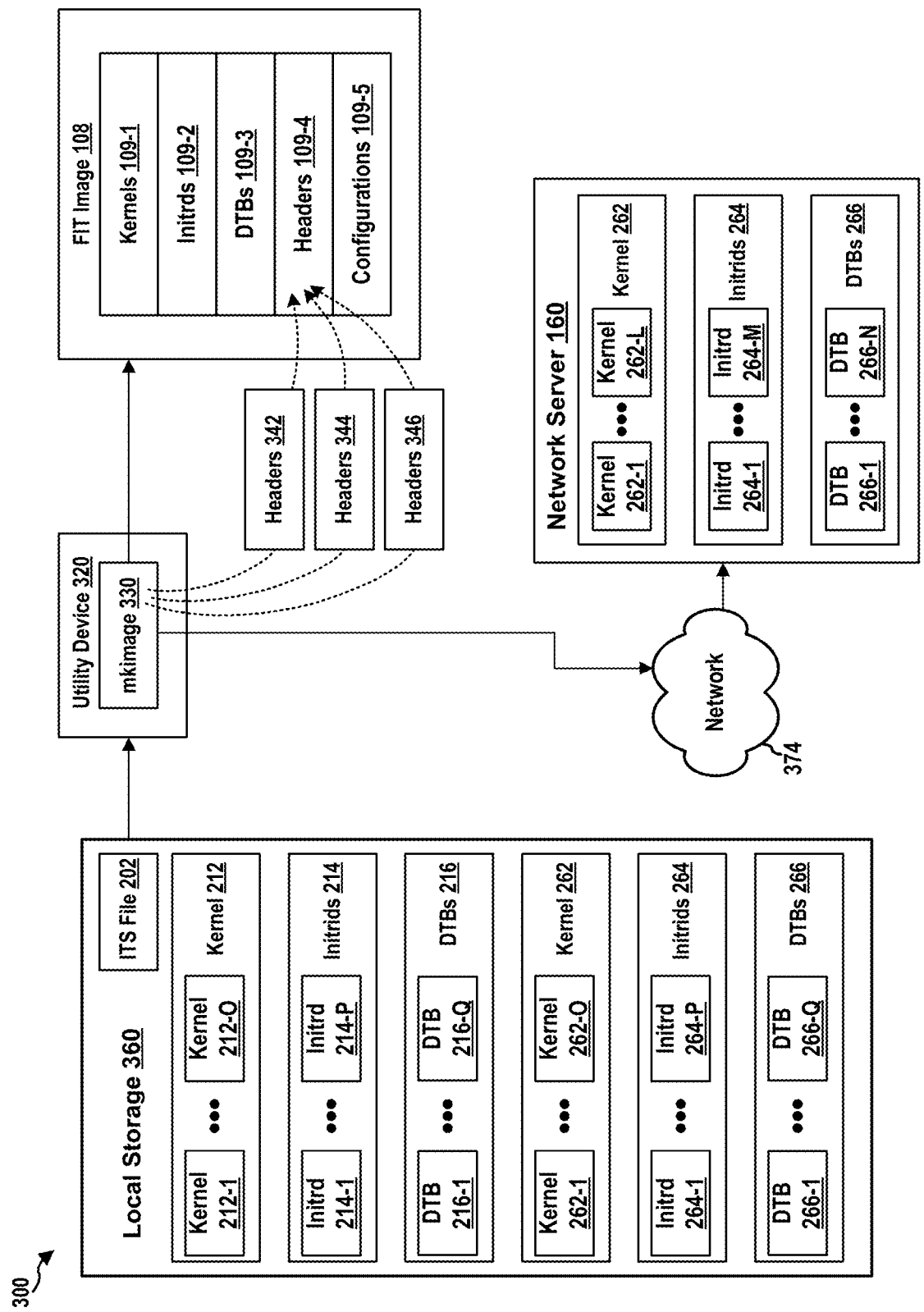

FIG. 3(A) and FIG. 3(B) are diagrams 300 illustrating a sequence of procedures for generating an FIT image. The ITS file 202 indicates the binaries and the locations of the binaries that need to be contained in the FIT image 108 as well as corresponding boot configurations each specify components needed for a particular boot. An image creation utility mkimage 330 reads the ITS file 202, locates each component indicated, places the component in the FIT image 108 or uploads the component to a network server as instructed by the ITS file 202, and creates the FIT image 108 accordingly.

More specifically, in procedure 302, the mkimage 330 executed on a utility device 320 reads the ITS file 202 from a local storage 360. In procedure 312, the mkimage 330 determines that the kernels 212-1 to 212-O are to be included to the FIT image 108, and the kernels 262-1 to 262-L are to be stored on the network server 160. In procedure 322, the mkimage 330 copies the kernels 212-1 to 212-O from the local storage 360 to the FIT image 108 to generate kernels 109-1. For example, the mkimage 330 reads "kernel 212-1" and "data=/incbin/("./zImage")", and accordingly add an entry in the structure of the FIT image 108 for the kernel 212-1, and includes the binary file "zImage" in the structure. In procedure 362, the mkimage 330 uploads the kernels 262-1 to 262-L to the network server 160. In procedure 382 the mkimage 330 generates a header 342 specifying the addresses of the kernels 262-1 to 262-L on the network server 160 and includes the headers 342 to the headers 109-4 of the FIT image 108. For example, the mkimage 330 reads "kernel 262-1" and "data=/tftp/("./anotherimage")", and accordingly add an entry in the structure of the FIT image 108 for the kernel 262-1. The mkimage 330 does not include any binary file of the kernel 262-1 in the structure. Rather, the mkimage generates a header for the kernel 262-1. The header indicates that the binary file "anotherimage" of the kernel 262-1 is on the network server 160. Further, in certain configuration, in procedure 362, the mkimage 330 may check whether the binary file "anotherimage" is already stored on the network server 160. If not, the mkimage 330 can transfer a copy of the binary file "anotherimage" from the local storage 360 to the network server 160.

In procedure 314, the mkimage 330 determines that the initrds 214-1 to 214-P are to be included to the FIT image 108, and that the initrds 264-1 to 264-M are to be stored on the network server 160. In procedure 324, the mkimage 330 copies the initrds 214-1 to 214-P from the local storage 360 to the FIT image 108 to generate initrds 109-2. For example, the mkimage 330 reads "initrd@214-1" and "data=/incbin/("./ramdisk")", and accordingly add an entry in the structure of the FIT image 108 for the initrd 214-1, and includes the binary file "ramdisk" in the structure. In procedure 364, the mkimage 330 uploads the initrds 264-1 to 264-M to the network server 160. In procedure 384 the mkimage 330 generates headers 344 specifying the addresses of the initrds 264-1 to 264-M on the network server 160 and includes the headers 344 to the headers 109-4 of the FIT image 108. For example, the mkimage 330 reads "initrd 264-1" and "data=/tftp/("./ramdisk2")", and accordingly add an entry in the structure of the FIT image 108 for the initrd 264-1. The mkimage 330 does not include any binary file of the initrd 264-1 in the structure. Rather, the mkimage generates a header for the initrd 264-1. The header indicates that the binary file "ramdisk2" of the initrd 264-1 is on the network server 160. Further, in certain configuration, in procedure 364, prior to uploading the binary file "ramdisk2", the mkimage 330 may check whether the binary file "ramdisk2" is already stored on the network server 160. If not, the mkimage 330 can transfer a copy of the binary file "ramdisk2" from the local storage 360 to the network server 160.

In procedure 316, the mkimage 330 determines that the DTBs 216-1 to 216-Q are to be included to the FIT image 108, and the DTBs 266-1 to 266-N are to be stored on the network server 160. In Procedure 326, the mkimage 330 copies the DTBs 216-1 to 216-Q from the local storage 360 to the FIT image 108 to generate DTBs 109-3. For example, the mkimage 330 reads "DTB@216-1" and "data=/incbin/ ("./devicetree.dtb")", and accordingly add an entry in the structure of the FIT image 108 for the DTB 216-1, and includes the binary file "devicetree.dtb" in the structure. In procedure 366, the mkimage 330 copies the DTBs 266-1 to 266-N to the network server 160. In procedure 386 the mkimage 330 generates a header 346 specifying the store address of the DTBs 266-1 to 266-N on the network server 160 and includes this header to the header 109-4 of the FIT image 108. For example, the mkimage 330 reads "DTB 266-1" and "data=/tftp/("./devicetree2.dtb")", and accordingly add an entry in the structure of the FIT image 108 for the DTB 266-1. The mkimage 330 does not include any binary file of the DTB 266-1 in the structure. Rather, the mkimage generates a header for the DTB 266-1. The header indicates that the binary file "devicetree2.dtb" of the DTB 266-1 is on the network server 160. Further, in certain configuration, the mkimage 330 may check whether the binary file "devicetree2.dtb" is already stored on the network server 160. If not, the mkimage 330 can transfer a copy of the binary file "devicetree2.dtb" from the local storage 360 to the network server 160.

In procedure 392, the mkimage 330 adds all the configurations 109-5 into the FIT image 108. As such, the kernels 109-1, initrds 109-2, DTBs 109-3, headers 109-4, and configurations 109-5 are placed in the FIT image 108.

Figure 4A:
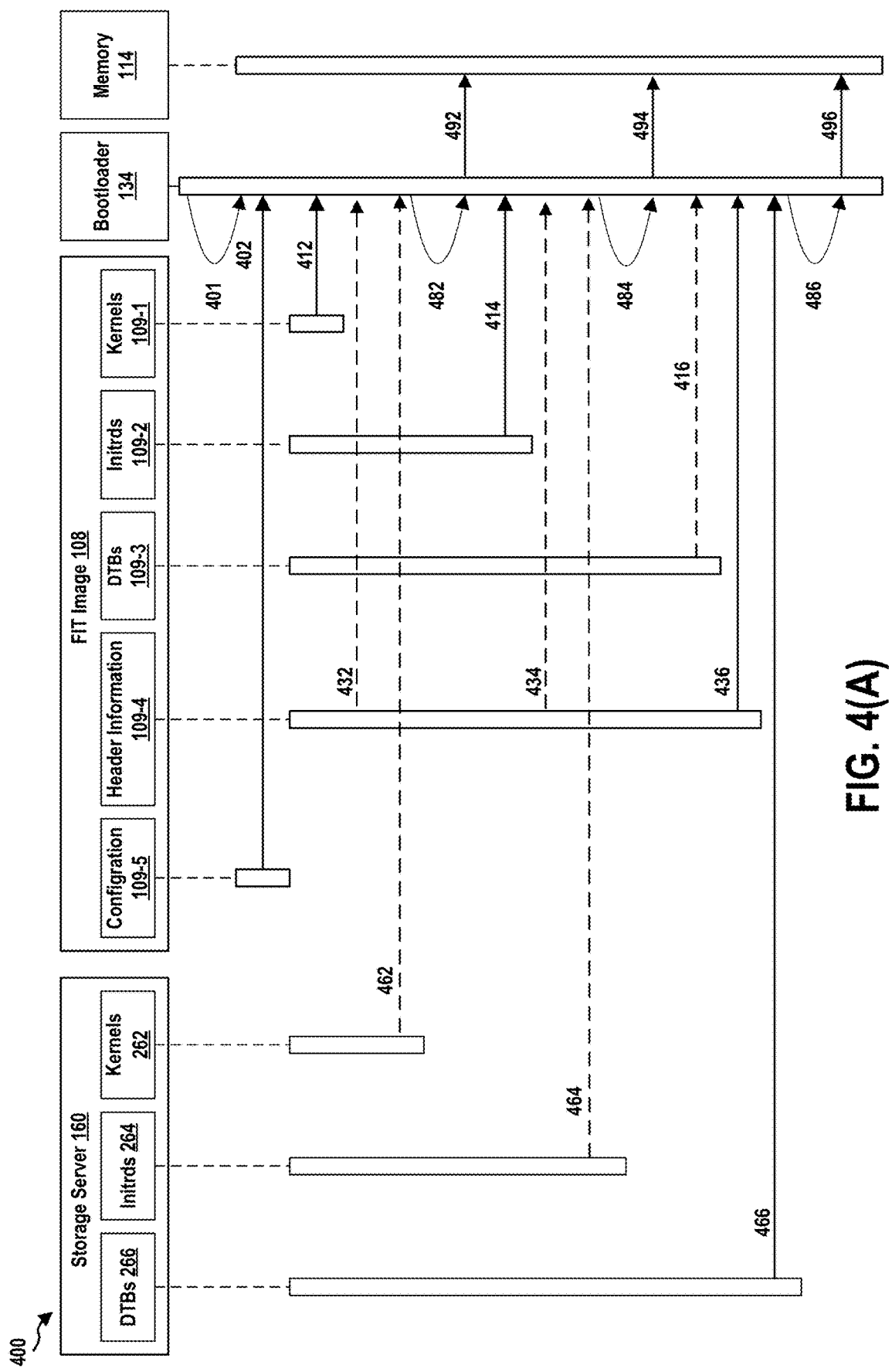
FIG. 4(A) and FIG. 4(B) are diagrams illustrating a booting process of a BMC.
Figure 4B:
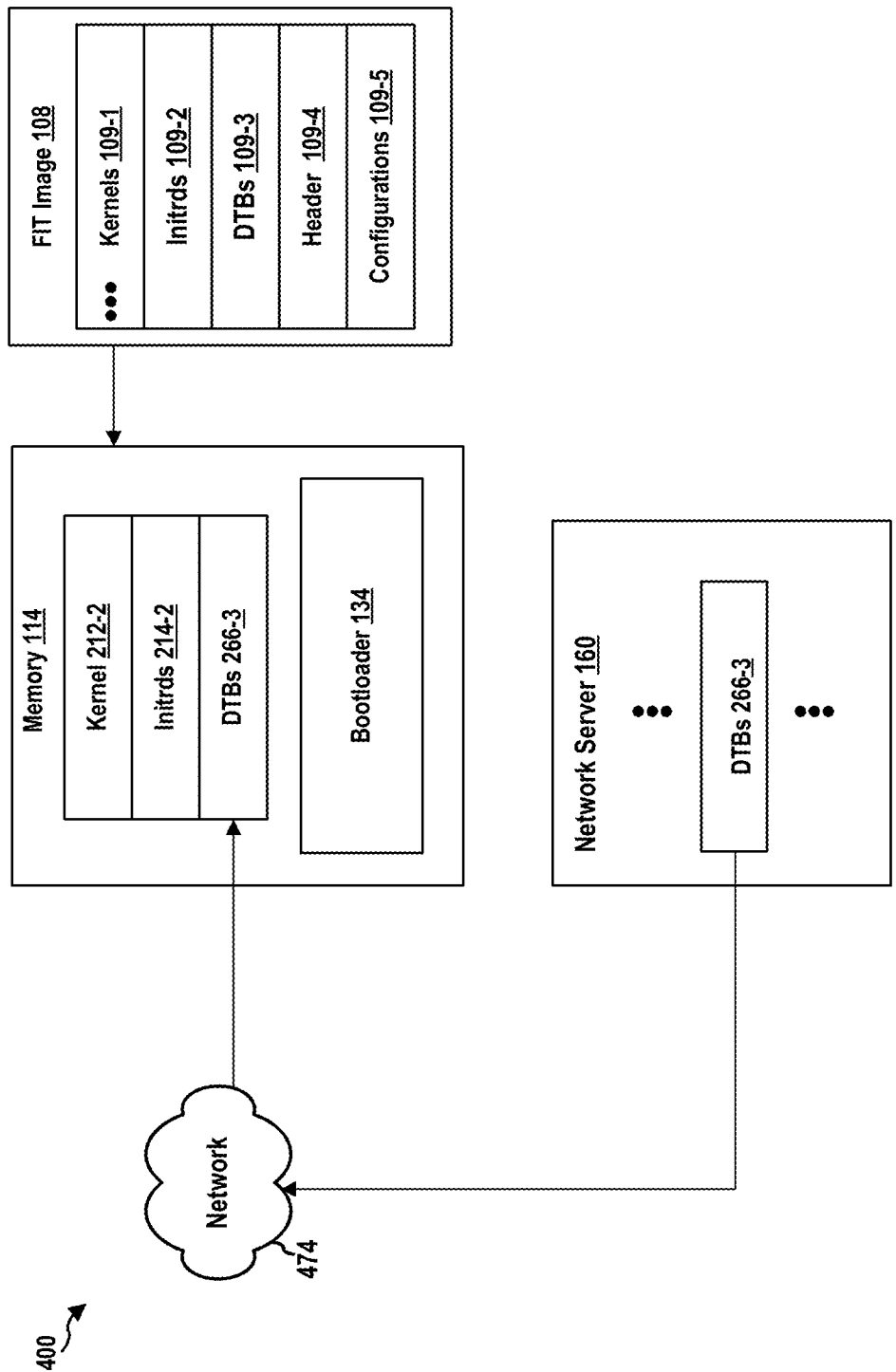

FIG. 4(A) and FIG. 4(B) are diagrams 400 illustrating a booting process of the BMC 102. After being powered on, the BMC 102 executes the bootloader 134. The bootloader 134 initially determines a specific configuration used for this BMC for booting. In on example, a settings file may be stored in the storage(s) 117 (e.g., a SPI storage). The settings file may indicate a particular configuration of the FIT image 108 to be used or hardware settings of the BMC 102. In procedure 401, the bootloader reads the particular configuration from the settings file or determines a particular configuration based on the hardware settings from the settings file. When the BMC 102 is not provisioned a settings file, the bootloader 134 may use the default configuration (e.g., the configuration 282-1) included in the FIT image 108. In this example, the bootloader 134 determines that the configuration 282-2 is to be used based on the setting file.

In procedure 402, the bootloader 134 reads the configuration 282-2 from the configurations 109-5 in the FIT image 108. The configuration 282-2 is as follows:
config@282-2 {
 description="Rescue configuration";
 kernel="kernel@212-2";
 ramdisk="ramdisk@214-2";
 DTB="DTB@266-3";
}

Based on the configuration 282-2, the bootloader 134 determines that kernel@212-2, ramdisk@214-2, and DTB@266-3 are to be loaded into the memory 114.

In procedure 412, the bootloader 134 locates the entry for the kernel 212-2 in the FIT image 108. The bootloader 134 further determines that the binary file of the kernel 212-2 is included in the FIT image 108 stored on the storage(s) 117. Accordingly, the bootloader 134 obtains the kernel 212-2 from the FIT image 108. In another example, the FIT image 108 may contain only a header in place of the binary files of the kernel. In that example, in procedure 432, the bootloader 134 parses the header, and determines a network address of the kernel binary file accordingly. In procedure 462, the bootloader 134 retrieves the kernel binary file from the network server 160 according to the network address specified in the header. In both examples, subsequently, in procedure 482, the bootloader 134 decompresses and decrypts the kernel binary file if necessary. In procedure 492, the bootloader 134 loads the executable kernel to the memory 114.

In procedure 414, the bootloader 134 locates the entry for the initrd 214-2 in the FIT image 108. The bootloader 134 further determines that the binary file of the initrd 214-2 is included in the FIT image 108. Accordingly, the bootloader 134 obtains the initrd 214-2 from the FIT image 108. In another example, the FIT image 108 may contain only a header in place of the binary file of the initrd. In that example, in procedure 434, the bootloader 134 parses the header, and determines a network address of the initrd binary file accordingly. In procedure 464, the bootloader 134 retrieves the initrd binary file from the network server 160 according to the network address specified in the header. In both examples, subsequently, in procedure 484, the bootloader 134 decompresses and decrypts the initrd binary file if necessary. In procedure 494, the bootloader 134 loads the executable initrd to the memory 114.

The bootloader 134 locates the entry for DTB@266-3 in the FIT image 108. In another example, the bootloader 134 further determines that the binary file of the DTB a, 266-3 is included in the FIT image 108 stored on the storage(s) 117. Accordingly, the bootloader 134, in procedure 416, obtains the DTB@266-3 from the FIT image 108. On the other hand, in this example, the FIT image 108 contains only a header in place of the binary file of the DTB. Accordingly, in procedure 436, the bootloader 134 parses the header, and determines a network address of the DTB binary file accordingly. In procedure 466, the bootloader 134 retrieves the DTB binary file from the network server 160 according to the network address specified in the header. In both examples, subsequently, in procedure 486, the bootloader 134 decompresses and decrypts the initrd binary file if necessary. In procedure 496, the bootloader 134 loads the executable DTB to the memory 114. After loading the binaries specified in the boot configuration, the bootloader 134 passes the control to the kernel loaded in the memory 114, which will boot the firmware of the BMC 102.

Figure 5:
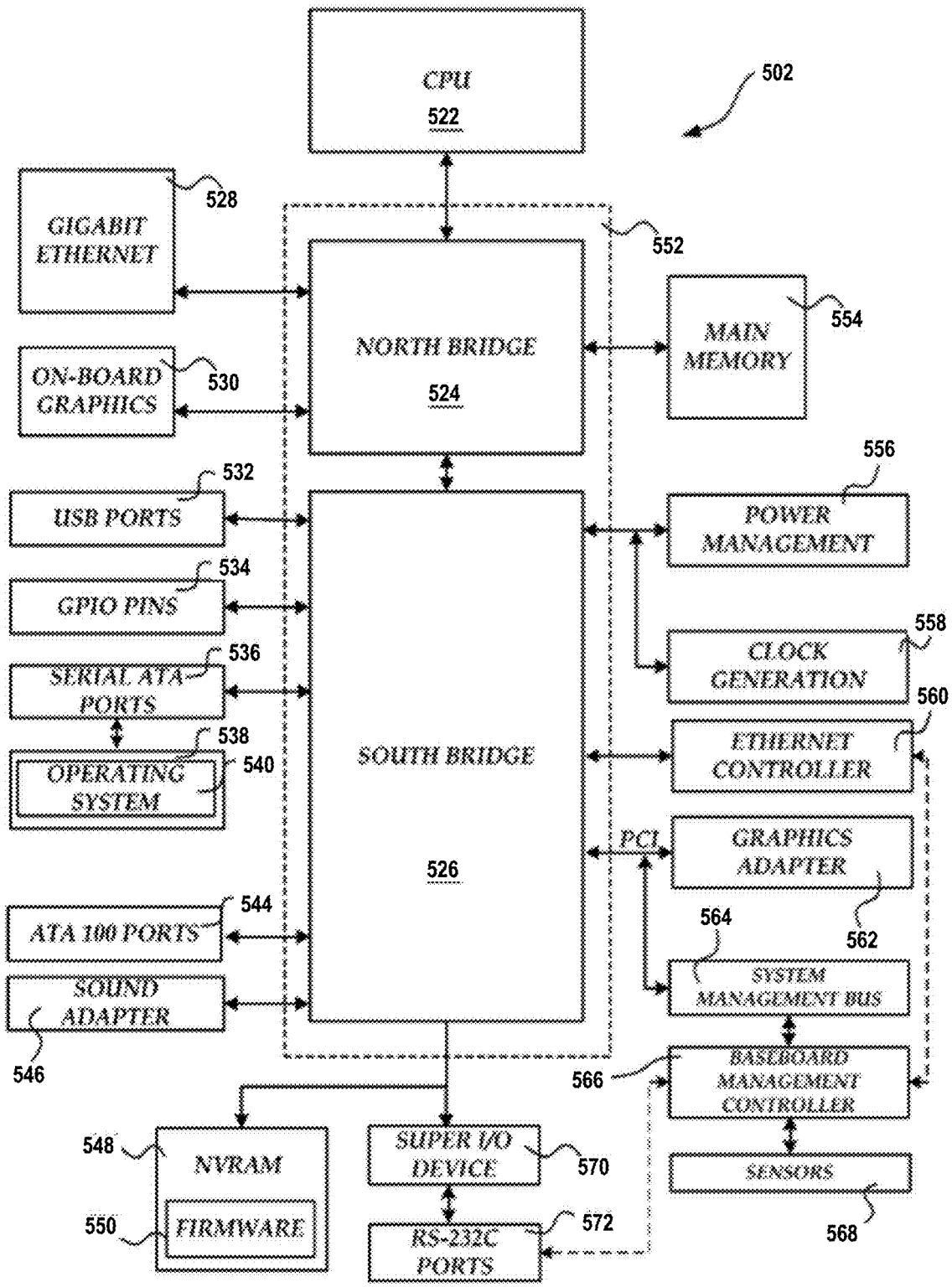
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including hand-held computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising: determining a booting configuration based on setting of the BMC; determining, from a firmware image and according to the booting configuration, a group of components, of an operating system (OS) of the BMC, to be loaded into a memory of the BMC; determining, from the firmware image, storage locations of the group of components; obtaining a first set of components of the group from one or more network locations according to the storage locations; and wherein the firmware image contains a first collection of components and a collection of indicators indicating one or more network locations at which a second collection of components are stored.

2. The method of claim 1, further comprising:
obtaining a second set of components of the group from the firmware image according to the storage locations.

3. The method of claim 1, further comprising:
prior to obtaining the second set of components, detecting that the second set of components are contained in the firmware image.

4. The method of claim 1, further comprising:
locating, in the firmware image, a first set of indicators corresponding to the first set of components, each indicator indicating a network location at which a corresponding component is stored.

5. The method of claim 1, further comprising:
loading the group of components into the memory of the BMC; and
executing the group of components.

6. The method of claim 1, wherein the firmware image contains a collection of booting configurations, each booting configuration indicating a respective group of components, selected from at least one the first collection of components and the second collection of components, to be loaded into the memory in a single booting process.

7. The method of claim 6, wherein the first collection of components and the second collection of components contains components forming a plurality of bootable operating systems.

8. A method of operating a device, comprising:
reading a source file specifying content of a firmware image;
placing, in the firmware image and according to the source file, a first collection of components and a collection of indicators indicating one or more network locations at which a second collection of components are stored;
placing a collection of booting configurations in the firmware image, each booting configuration indicating a respective group of components, of an operating system (OS) of a baseboard management controller (BMC) and selected from at least one the first collection of components and the second collection of components, to be loaded into the memory in a single booting process; and
generating the firmware image.

9. The method of claim 8, further comprising:
prior to placing the first collection of components in the firmware image, locating the first collection of components in a storage device.

10. The method of claim 8, further comprising:
prior to placing the collection of indicators, determining, based on the source file, that the second collection of components are to be stored at the one or more network locations and are to be referenced in the firmware image; and
generating the collection of indicators.

11. The method of claim 8, further comprising:
transferring the second collection of components from a storage device to the one or more network locations.

12. The method of claim 8, further comprising:
transferring the generated firmware image to a storage device of a target BMC.

13. The method of claim 8, wherein the first collection of components and the second collection of components contains components forming a plurality of bootable operating systems.

14. An apparatus, the apparatus being a baseboard management controller (BMC), comprising: a first memory; and at least one processor coupled to the first memory and configured to: determine a booting configuration based on setting of the BMC; determine, from a firmware image and according to the booting configuration, a group of components, of an operating system (OS) of the BMC, to be loaded into a memory of the BMC; determine, from the firmware image, storage locations of the group of components; obtain a first set of components of the group from one or more network locations according to the storage locations; and the firmware image contains a first collection of components and a collection of indicators indicating one or more network locations at which a second collection of components are stored.

15. The apparatus of claim 14, wherein the at least one processor is further configured to:
obtain a second set of components of the group from the firmware image according to the storage locations.

16. The apparatus of claim 14, wherein the at least one processor is further configured to:
prior to obtaining the second set of components, detect that the second set of components are contained in the firmware image.

17. The apparatus of claim 14, wherein the at least one processor is further configured to:
locate, in the firmware image, a first set of indicators corresponding to the first set of components, each indicator indicating a network location at which a corresponding component is stored.

18. The apparatus of claim 14, wherein the at least one processor is further configured to:
load the group of components into the memory of the BMC; and
execute the group of components.

\* \* \* \* \*